United States Patent [19]

Knorre et al.

[11] 4,094,693

[45] June 13, 1978

[54] D,L TARTARIC ACID AS RETARDANT FOR GYPSUM PLASTER

[75] Inventors: Helmut Knorre, Seligenstadt; Manfred Langer, Hanau; Peter Leidl, Cologne, all of Germany

[73] Assignee: Deutsche Gold- und Silber-Scheideanstalt vormals Roessler, Frankfurt, Germany

[21] Appl. No.: 723,173

[22] Filed: Sep. 14, 1976

[30] Foreign Application Priority Data

Sep. 24, 1975 Germany .............................. 2542535

[51] Int. Cl.$^2$ .............................................. C04B 11/14
[52] U.S. Cl. ..................................... 106/111; 106/315
[58] Field of Search ............... 106/111, 112, 113, 114, 106/115, 116, 315

[56] References Cited

U.S. PATENT DOCUMENTS

| | | | |
|---|---|---|---|
| 169,212 | 10/1875 | Warwick | 106/111 |
| 392,481 | 11/1888 | Williams | 106/111 |
| 422,269 | 2/1890 | West | 106/315 |
| 449,653 | 4/1891 | Abell | 106/111 |
| 2,508,480 | 5/1950 | Ainsworth | 106/111 |

FOREIGN PATENT DOCUMENTS 582,505  11/1946  United Kingdom.

OTHER PUBLICATIONS

Riddle II, W. C. "Calcined Gypsum" *Roch Products,* Oct. 1954, pp. 109–113.

*Primary Examiner*—Winston A. Douglas
*Assistant Examiner*—John P. Sheehan
*Attorney, Agent, or Firm*—Cushman, Darby & Cushman

[57] ABSTRACT

Industrial gypsum plaster (plaster of Paris) having a delayed setting time is prepared by including D,L-tartaric acid and sufficient calcium hydroxide that a 5 weight % aqueous suspension of the plaster has a pH of at least 11.5.

8 Claims, No Drawings

D,L TARTARIC ACID AS RETARDANT FOR GYPSUM PLASTER

In order to use gypsum plasters (plaster of Paris) for different purposes, there are required different setting times for the production of reasonable working spans.

To a limited extent, the stiffening of gypsum can be regulated by a modification of the process of production in regard to crystal structure and particle size. However, one is instructed in most cases to add so-called setting regulators.

These materials have had increasing industrial interest, particularly with the mechanical working of gypsum plasters and economization as well as automatization of the process. This has been recognized also in a large number of industrial publications as well as patent applications, see Ullmann, Vol. 8 (3rd Edition), pages 97 et seq.; A. Kruis and H. Spath, Tonindustrie-Zeitung, Vol. 75, pages 341–351 and 395–399 (1957); W. C. Ridell, Rock Products (1954), page 109 et seq.; British Pat. No. 999,487, Cavadino British Pat. No. 484,304; Belgian Pat. No. 645,593; German Pat. No. 2,325,737; German Offenlegungsschrift No. 2,331,670; R. A. Kuntze, Nature, Vol. 211, pages 406 et seq.; (1966) and the literature cited therein.

Of the numerous setting retarders for various uses above all natural tartaric acid (L-tartaric acid, tartaric acid) in alkaline worked gypsum plasters have acquired practical significance. Even in small additive amounts from 0.01 weight % they effect a clear delay in setting and make possible, depending on the amount of additive the establishment of well gradated retarding values.

The greatest advantage of natural tartaric acid compared to other setting retarders however is in that it still does a good job of retarding the complete setting of the gypsum plaster even after beginning of the stiffening. The latter is generally desired because thereby even after the beginning of stiffening, the slaked gypsum still remains workable for a longer time. Finally, it is also very essential that the expansion properties in the hydration as well as the strength and adhesive power is influenced in desired manner by addition of natural tartaric acid.

The adequate maintenance of the user with L-tartaric acid, however, as has been shown recently, is not guaranteed since even today there is employed as the crude material for the industrial recovery of tartaric acid the tartar accumulating in varying amounts in the production of wine.

Therefore, there has long been the question of supplying a completely synthetically producible substitute for L-tartaric acid free of natural conditioning factors. The previously employed replacement products as, for example, gluconic acid, citric acid or malic acid or their water soluble salts, however, are not able to satisfy the users, above all because of the different setting characteristics and influence of the physical properties of the plaster (adhesive power, strength, etc.).

As for example is evident from German OS No. 2,331,670, the substitution of natural tartaric acid by citric acid leads to a strong deterioration of the setting properties of mechanical plaster gypsum. Besides, it is disadvantageous that the presently known substitutes always require the use of higher amounts of additives in order to produce nearly the same retarding value as that of natural tartaric acid.

It is the object of the present invention to produce an industrial gypsum plaster whose setting times correspond to those of L-tartaric acid.

It has now been found that these setting times are attained in an industrial gypsum plaster if there is present D,L-tartaric acid and so much calcium hydroxide that a 5 weight % aqueous suspension of the plaster has a pH value of at least 11.5

By industrial gypsum plasters, there are included, among others, lime gypsum plaster, plaster gypsum, adhesive gypsum, mortar gypsum, finished mortar gypsum, plaster gypsum for mechanical casting.

The D,L-tartaric acid used can be added independent of its process of production.

The mixture of gypsum and tartaric acid takes place according to the customary process in the gypsum industry.

The preferred pH range is between 12.00 and that of a saturated solution of $Ca(OH)_2$. It was not to be expected that L-tartaric acid could be replaced by D,L-tartaric acid since natural tartaric acid and racemic acid differ in several important chemical and physical properties, e.g., in the solubility of the corresponding calcium salts. Because of the poor solubility of calcium-D,L-tartrate (45 mg/l at 25° C.) it must be expected that the D,L-tartaric acid added to the gypsum plaster would precipitate as the calcium salt and thereby made ineffective. On the contrary, however, calcium-L-tartrate has a sufficient solubility (360 mg/l at 25° C.) to form no insoluble precipitate with calcium ions in gypsum water, see C. R. Fresenius, Liebigs Annalen der Chemie 41, 1 (1842).

However, it has now been surprisingly shown that the solubility product of calcium, D,L-tartrate in the slaking of alkaline gypsum plaster with tartaric acid amounts up to 0.15% based on the gypsum is not exceeded and that at increased concentrations of D,L-tartaric acid a precipitation of the tartaric acid from the alkaline solution takes place only after standing for hours.

With pH values of 11.5 and above, there is attained the setting retardations required in practice, so that the natural tartaric acid can be replaced by D,L-tartaric acid in the generally customary working conditions of anhydrite and semi hydrate plasters without any limitations. To the industrial gypsum plasters with the customary additives of wetting agents, plastifying agents and adhesive agents there are added according to the invention 0.01 to 0.5 weight %, preferably 0.02 to 0.2 weight % of D,L-tartaric acid based on the plaster and, as pointed out above, such an amount of calcium hydroxide is added that the pH of a 5 weight % aqueous paste of the plaster has a pH of at least 11.5. Generally, for that purpose it is necessary to use at least 0.25 weight % of calcium hydroxide based on the gypsum plaster. Preferably, there is used 1.5 to 6 weight % of calcium hydroxide.

As with natural tartaric acid, the particle size of the D,L-tartaric acid as much as possible should lie below 200μ. Preferred are particle spectrums having a portion of at least 95% below 200μ.

In this manner, there is guaranteed a good distribution in the mixing of the dry D,L-tartaric acid with the gypsum plaster. Thereby, there is simultaneously avoided local lowering of the pH through too high local concentrations of D,L-tartaric acid, be it due to non-uniform distribution or too large particles. Through these local conditions, the setting retardation does not occur and the slaking of the plaster is inhomogeneous.

An especial industrial advantage in the production of plaster according to the invention using D,L-tartaric acid is in the fact that D,L-tartaric acid is not inclined to cake, whereby an increase in particle size through growth of secondary crystals does not occur as does happen with natural tartaric acid. A change in particle size does not occur even upon storage under changing conditions of climate and moisture. This is likewise an essential factor for working in automatic operations as the good pourability of product which is further aided by the addition of free flowing agents, e.g., finely divided silicas.

Of course, it is already known to add D,L-tartaric acid to influence the crystal shape in the production of semi-hydrate, i.e., of $\alpha\text{-CaSO}_4\cdot\frac{1}{2}H_2O$, see Haddon British Pat. No. 582,505. However, its suitability and effectiveness as a setting retarder has never been described previously.

For the first time through the plaster of the invention is it possible to satisfactorily replace L-tartaric acid by D,L-tartaric acid.

The invention will be further explained in connection with the following examples.

All percents are weight percents.

The measurements of setting characteristics took place with the Vicat-plonger cone according to DIN (German Industrial Standard) 1168.

EXAMPLE 1

| Composition: | Plaster Gypsum | |
|---|---|---|
| | $CaSO_4$ | 33.5% |
| | $CaSO_4\cdot\frac{1}{2}H_2O$ | 42.2% |
| | $MgCO_3$ | 4.6% |
| | $CaCO_3$ | 3.7% |
| | $Ca(OH)_2$ | 2.1% |
| | Insolubles | 12.7% |
| | pH of a 5% paste in water 12.7 | |

Sesquioxides not estimated

| Water-Gypsum Ratio | Slump Measurement (mm) | Additive % | Retarder | Stiffening Beginning | End (Min) |
|---|---|---|---|---|---|
| 0.456 | 161 | 0.03 | L-tartaric acid | 31 | 55 |
| 0.456 | 160 | 0.05 | L-tartaric acid | 42 | 80 |
| 0.456 | 162 | 0.07 | L-tartaric acid | 53 | 103 |
| 0.456 | 161 | 0.03 | D,L-tartaric acid | 36 | 55 |
| 0.456 | 163 | 0.05 | D,L-tartaric acid | 51 | 100 |
| 0.456 | 166 | 0.07 | D,L-tartaric acid | 75 | 160 |

EXAMPLE 2

| Finished Mortar Gypsum Composition | |
|---|---|
| $CaSO_4$ | 3.8% |
| $CaSO_4\cdot\frac{1}{2}H_2O$ | 77.3% |
| $MgCO_3$ | 3.7% |
| $CaCO_3$ | 2.3% |
| $Ca(OH)_2$ | 3.9% |
| Insolubles | 4.5% |
| pH of a 5% paste in water 12.6 | |

Sesquioxides not estimated

TABLE

| Water-Gypsum Ratio | Slump Measurement (mm) | Additive % | Retarder | Stiffening Beginning | End (Min) |
|---|---|---|---|---|---|
| 0.716 | 162 | 0.035 | L-tartaric acid | 32 | 48 |
| 0.720 | 164 | 0.050 | L-tartaric acid | 45 | 75 |
| 0.700 | 157 | 0.100 | L-tartaric acid | 67 | 130 |
| 0.720 | 165 | 0.150 | L-tartaric acid | 91 | 195 |
| 0.716 | 164 | 0.035 | D,L-tartaric acid | 36 | 47 |
| 0.712 | 160 | 0.050 | D,L-tartaric acid | 49 | 77 |
| 0.700 | 159 | 0.100 | D,L-tartaric acid | 77 | 160 |
| 0.720 | 163 | 0.150 | D,L-tartaric acid | 91 | 190 |

EXAMPLE 3

| Adhesive Plaster Gypsum Composition | |
|---|---|
| $CaSO_4\cdot\frac{1}{2}H_2O$ | 61.5% |
| $MgCO_3$ | 3.0% |
| $CaCO_3$ | 19.2% |
| $Ca(OH)_2$ | 1.9% |
| Insolubles | 6.6% |
| Moisture | 1.2% |
| pH of a 5% paste in water 12.4 | |

Sesquioxides not estimated

| Water-Gypsum Ratio | Slump Measurement (mm) | Additive % | Retarder | Stiffening Beginning | End (min) |
|---|---|---|---|---|---|
| 0.600 | 161 | 0.01 | L-tartaric acid | 23 | 28 |
| 0.600 | 162 | 0.03 | L-tartaric acid | 73 | 113 |
| 0.600 | 161 | 0.05 | L-tartaric acid | 105 | 175 |
| 0.600 | 163 | 0.01 | D,L-tartaric acid | 21 | 28 |
| 0.600 | 164 | 0.03 | D,L-tartaric acid | 76 | 107 |
| 0.600 | 164 | 0.05 | D,L-tartaric acid | 120 | 205 |

EXAMPLE 4

| Plaster Gypsum for mechanical casting Composition | |
|---|---|
| $CaSO_4$ | 52.5% |
| $CaSO_4\cdot\frac{1}{2}H_2O$ | 29.6% |
| $MgCO_3$ | 4.0% |
| $CaCO_3$ | 4.2% |
| $Ca(OH)_2$ | 1.9% |
| Insolubles | 6.9% |
| pH value of a 5% paste in water 12.2 | |

Sequioxides not estimated

| Water-Gypsum Ratio | Slump Measurement (mm) | Additive % | Retarder | Stiffening Beginning | End (min) |
|---|---|---|---|---|---|
| 0.424 | 169 | 0.10 | L-tartaric acid | 59 | 100 |
| 0.424 | 175 | 0.12 | L-tartaric acid | 81 | 130 |
| 0.424 | 168 | 0.10 | D,L-tartaric acid | 57 | 98 |
| 0.424 | 167 | 0.12 | D,L-tartaric acid | 75 | 130 |

EXAMPLE 5

| Plaster Gypsum for mechanical casting Composition | |
|---|---|
| $CaSO_4$ | 35.1% |
| $CaSO_4\cdot\frac{1}{2}H_2O$ | 12.5% |
| $MgCO_3$ | 4.4% |
| $CaCO_3$ | 36.5% |
| $Ca(OH)_2$ | 4.5% |
| Insolubles | 6.8% |

Sesquioxides not estimated

TABLE

| Water-Gypsum Ratio | Slump Measurement (mm) | Additive % | Retarder | Stiffening Beginning | Stiffening End (min) |
|---|---|---|---|---|---|
| 0.488 | 163 | 0.35 | L-tartaric acid | 87 | 133 |
| 0.488 | 165 | 0.50 | L-tartaric acid | 113 | 180 |
| 0.488 | 166 | 0.70 | L-tartaric acid | 128 | 215 |
| 0.488 | 167 | 0.35 | D,L-tartaric acid | 86 | 128 |
| 0.488 | 164 | 0.50 | D,L-tartaric acid | 130 | 205 |
| 0.465 | 162 | 0.70 | D,L-tartaric acid | 145 | 290 |

For a large scale use, as stated above, the use of D,L-tartaric acid is of greatest advantage because it is not hygroscopic and therefore is storage stable.

EXAMPLE 6

Investigation of Caking Behavior

In a perforated cylinder having a diameter of 55 cm there were placed in each case 50 grams of tartaric acid and a 10 kg weight and the cylinders stored in an open air weathering state (with protection from rain). Under the load of the weight, there were formed from the tartaric acid powders tablets on which there were measured the following crushing strengths:

| (a) | D,L-tartaric acid | 0.04 kg/cm$^2$ |
|---|---|---|
| (b) | L-tartaric acid | 1.25 kg/cm$^2$ |

EXAMPLE 7

Obtaining the Particle Size distribution

From the following investigations, it can be seen that the particle size distribution of D,L-tartaric acid both with and without the addition of 1% finely divided silica as "free flowing agent" is practically unchanged after storage for several months. The measurements were carried out with a vibrating screen and the standard sieves belonging thereto according to DIN 4188.

TABLE 1

| Sample Sieve Fraction | 1 % | 2 % | 3 % | 4 % | 5 % |
|---|---|---|---|---|---|
| >1000 μ | 2.5 | 2.9 | 2.7 | 2.9 | 2.8 |
| 630 – 1000μ | 2.1 | 2.4 | 2.3 | 2.5 | 2.3 |
| 400 – 630μ | 2.1 | 2.5 | 2.2 | 2.6 | 2.3 |
| 250 – 400μ | 5.0 | 5.2 | 4.9 | 6.5 | 5.0 |
| 160 – 250μ | 16.8 | 18.7 | 17.0 | 20.2 | 16.8 |
| 125 – 160μ | 19.2 | 19.9 | 19.3 | 19.4 | 19.8 |
| 90 – 125μ | 15.1 | 15.1 | 15.1 | 14.4 | 14.9 |
| 71 – 90 μ | 11.6 | 11.6 | 12.3 | 10.8 | 12.2 |
| 40 – 71μ | 17.4 | 17.7 | 16.4 | 16.7 | 16.3 |
| <40μ | 8.2 | 4.0 | 7.8 | 4.0 | 7.6 |

In Table 1, the 5 columns are as follows:
1. D,L-tartaric acid from production;
2. D,L-tartaric acid after storing for 3 months;
3. D,L-tartaric acid with 1% finely divided SiO$_2$ as free flowing agent after storing for 3 months;
4. D,L-tartaric acid after storing for 12 months; and
5. D,L-tartaric acid with 1% finely divided SiO$_2$ as free flowing agent after storing for 12 months.

EXAMPLE 8

Flow behavior of Tartaric Acid

To measure the flow behavior there were used spouted cylindrical glasses having a diameter of 3.6 – 3.7 cm which narrowed conically toward the bottom to spouted opening of 2.5 mm, 5 mm, 8 mm, 12 mm and 18 mm. These glasses in each case were charged with 50 grams of tartaric acid and the ability to flow out and the time of flowing out observed.

TABLE 2

| Sample | Time of Flowing Out in Seconds: | | | | |
|---|---|---|---|---|---|
| | 18 mm | 12 mm | 8 mm | 5 mm | 2.5 mm |
| 1 | 4* | 10* | 36** | — | — |
| 2 | 15* | 25** | — | — | — |
| 3 | 10** | — | — | — | — |
| 4 | 35** | — | — | — | — |
| 5 | 2 | 4 | 12  45 | 250 | |
| 6 | 3 | 6 | 15 | 55 | 250 |
| 7 | 4* | 13* | 31** | 62*** | 290*** |

*Single striking of the spouted glass.
**Several strikings of the spouted glass.
***Continuous striking of the spouted glass.
— No flowing out.

The samples in Table 2 are as follows:
1. D,L-tartaric acid;
2. D,L-tartaric acid, stored for 14 days in the laboratory;
3. L-tartaric acid;
4. L-tartaric acid, stored for 14 days in the laboratory;
5. D,L-tartaric acid with 1% finely divided SiO$_2$ as free flowing agent;
6. D,L-tartaric acid with 1% finely divided SiO$_2$ as free flowing agent stored for 14 days in the laboratory; and
7. L-tartaric acid, treated with 0.5% of hydrophobized, finely divided silica.

The compositions can comprise, consist essentially of or consist of the materials set forth.

What is claimed is:

1. Gypsum plaster having sufficient D,L-tartaric acid therein to delay the setting time of the plaster and having sufficient calcium hydroxide that a 5% by weight aqueous paste of the plaster has a pH of at least 11.5, the content of D,L-tartaric acid being between 0.01 and 0.5 weight %.

2. Gypsum plaster according to claim 1 wherein the content of D,L-tartaric acid is 0.02 to 0.2 weight %.

3. Gypsum plaster according to claim 2 wherein the content of calcium hydroxide is 1.5 to 6.0 weight %.

4. Gypsum plaster according to claim 2 wherein the calcium hydroxide is present in an amount ranging from the amount to provide a 5% by weight aqueous paste of the plaster having a pH of 12.00 up to the pH of a 5% by weight aqueous paste saturated with calcium hydroxide.

5. Gypsum plaster according to claim 1 wherein the content of calcium hydroxide is 1.5 to 6.0 weight %.

6. Gypsum plaster according to claim 1 wherein the calcium hydroxide is present in an amount ranging from the amount to provide a 5% by weight aqueous paste of the plaster having a pH of 12.00 up to the pH of a 5% by weight aqueous paste saturated with calcium hydroxide.

7. Gypsum plaster according to claim 1 wherein the D,L-tartaric acid is the sole tartaric acid present.

8. A gypsum plaster composition according to claim 1 wherein the composition consists essentially of the gypsum plaster, the D,L-tartaric acid and the calcium hydroxide.

* * * * *